(12) United States Patent
Kikuchi

(10) Patent No.: US 9,059,595 B2
(45) Date of Patent: Jun. 16, 2015

(54) CHARGING CONTROL METHOD FOR SECONDARY BATTERY AND CONTROL DEVICE

(75) Inventor: Yoshiaki Kikuchi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 333 days.

(21) Appl. No.: 13/577,088

(22) PCT Filed: Apr. 28, 2010

(86) PCT No.: PCT/JP2010/057596
§ 371 (c)(1),
(2), (4) Date: Aug. 3, 2012

(87) PCT Pub. No.: WO2011/135701
PCT Pub. Date: Nov. 3, 2011

(65) Prior Publication Data
US 2012/0299537 A1    Nov. 29, 2012

(51) Int. Cl.
*G06F 9/455* (2006.01)
*G06F 17/50* (2006.01)
*H02J 7/00* (2006.01)

(52) U.S. Cl.
CPC ............. *H02J 7/0091* (2013.01); *Y02B 40/90* (2013.01); *Y02E 70/40* (2013.01)

(58) Field of Classification Search
CPC ....... H02J 7/0031; H02J 7/0047; H02J 7/045; H02J 7/0026; H02J 7/0029; H02J 2007/0098; H02J 7/0016; H02J 7/0021; H01L 2924/00; H01L 2224/48247; H01M 10/0525; G01R 31/3693; Y02T 90/14

USPC .................................. 320/106, 107, 134, 152
See application file for complete search history.

(56) References Cited

U.S. PATENT DOCUMENTS

| | | | |
|---|---|---|---|
| 6,075,346 A | 6/2000 | Kikuchi et al. | |
| 6,252,377 B1* | 6/2001 | Shibutani et al. | 320/132 |
| 8,080,979 B2* | 12/2011 | Abe | 320/134 |

(Continued)

FOREIGN PATENT DOCUMENTS

| | | |
|---|---|---|
| EP | 1 309 029 A2 | 5/2003 |
| EP | 1 309 029 A3 | 5/2003 |

(Continued)

OTHER PUBLICATIONS

Extended European Search Report issued Nov. 4, 2013 in European Patent Application No. 10850718.7.

(Continued)

*Primary Examiner* — Brian Ngo
(74) *Attorney, Agent, or Firm* — Oblon, McClelland, Maier & Neustadt, L.L.P.

(57) ABSTRACT

The disclosed device for controlling charging of a secondary battery includes a step for calculating an amount of heat generated by a secondary battery on the basis of an inter-electrode-plate voltage, internal resistance, a current value, and charging efficiency; a step for calculating an amount of allowable generated heat of the secondary battery on the basis of a temperature of the secondary battery and the cooling ability of a cooling means that cools the secondary battery; and a step for limiting the charging power of the secondary battery when the aforementioned amount of heat generated is greater than the aforementioned amount of allowable heat generation.

12 Claims, 4 Drawing Sheets

(56) References Cited

U.S. PATENT DOCUMENTS

| | | | |
|---|---|---|---|
| 2002/0195999 A1* | 12/2002 | Kimura et al. | 320/134 |
| 2003/0087148 A1* | 5/2003 | Minamiura | 429/62 |
| 2007/0120537 A1 | 5/2007 | Yamamoto | |
| 2008/0238357 A1* | 10/2008 | Bourilkov et al. | 320/106 |
| 2009/0326749 A1* | 12/2009 | Uchida | 701/22 |
| 2010/0079111 A1* | 4/2010 | Masuda | 320/134 |
| 2010/0295503 A1* | 11/2010 | Bourilkov et al. | 320/106 |
| 2012/0019200 A1* | 1/2012 | Abe | 320/107 |

FOREIGN PATENT DOCUMENTS

| | | |
|---|---|---|
| JP | 11 187577 | 7/1999 |
| JP | 2002 48848 | 2/2002 |
| JP | 2002 151166 | 5/2002 |
| JP | 2002 233070 | 8/2002 |
| JP | 2003 101674 | 4/2003 |
| JP | 2005-117727 A | 4/2005 |
| JP | 2006 101674 | 4/2006 |
| JP | 2009 81958 | 4/2006 |
| JP | 2006 172931 | 6/2006 |

OTHER PUBLICATIONS

International Search Report Issued Jul. 20, 2010 in PCT/JP10/57596 Filed Apr. 28, 2010.

Office Action issued Dec. 22, 2014 in European Patent Application No. 10 850 718.7.

* cited by examiner

CHARGING CONTROL METHOD FOR SECONDARY BATTERY AND CONTROL DEVICE

TECHNICAL FIELD

The present invention relates to a method for controlling charging of a secondary battery and to a control device.

BACKGROUND ART

Electric vehicles in which an electric motor is mounted (including hybrid vehicles) drive the electric motor by using electric power stored in a secondary battery. Regenerative braking is a function specific to these electric vehicles. With regenerative braking, an electric motor is caused to function as a power generator during braking of a vehicle, to thereby convert kinetic (motion) energy of the vehicle to electric energy for performing braking. Further, the electric energy that is obtained is supplied to a secondary battery for charging and is reused at the time of acceleration or the like.

Here, in order to efficiently store, in the secondary battery, the electric power generated during the regenerative braking, the secondary battery should have a sufficient capacity. It is therefore desirable to control the electric power stored in the secondary battery such that the secondary battery can receive the regenerative electric power or the secondary battery can supply the electric power to the electric motor upon request.

For example, Patent Literature 1 discloses a device for controlling charging/discharging of a secondary battery, which includes a temperature detection section which detects the temperature of a secondary battery, and a charging/discharging electric power control section that controls the charging/discharging electric power such that an upper limit value of the charging/discharging electric power which varies in accordance with a predetermined temperature is not exceeded, when the detected temperature is a predetermined temperature or lower.

Also, Patent Literature 2 discloses a device for controlling charging/discharging of a secondary battery, which includes a temperature detection unit which detects the temperature of a secondary battery, a stored electricity amount detection unit which detects the amount of electricity stored in the secondary battery, a charging/discharging electric power limitation unit which controls the charging/discharging electric power such that the charging/discharging electric power does not exceed a predetermined charging/discharging electric power upper limit value based on the detected temperature and the amount of stored electricity which is detected, for example.

Further, Patent Literature 3 discloses a device for controlling charging/discharging of a secondary battery, which includes an estimation unit which estimates the temperature of a secondary battery, and a limitation unit which limits the charging/discharging electric power of the secondary battery based on the estimated temperature of the secondary battery, for example.

In addition, Patent Literature 4 discloses a charging/discharging control device, which includes a charging/discharging suppression unit which estimates an amount of heat generated by each unit cell after elapse of a predetermined time period based on charging/discharging electric current flowing in a group of batteries, determines whether or not the estimated amount of generated heat exceeds a predetermined value, and, when determining that the predetermined value is exceeded, suppresses the charging/discharging electric power flowing in the group of batteries, for example.

Moreover, Patent Literature 5 discloses a charging/discharging control device, which includes a detection section which detects an operation state of an air conditioning device which is used for temperature adjustment of a battery, and a setting unit which sets a limit value of a charging amount or a discharging amount with respect to the battery in accordance with the operation state.

PRIOR ART DOCUMENTS

Patent Literature

Patent Literature 1: JP 2003-101674A
Patent Literature 2: JP 11-187577A
Patent Literature 3: JP 2006-101674A
Patent Literature 4: JP 2009-81958A
Patent Literature 5: JP 2006-172931A

SUMMARY OF THE INVENTION

Technical Problems

However, as none of the technologies disclosed in Patent Literature 1 to 5 reflects the amount of heat generated by the secondary battery when the secondary battery is charged in a situation in which the charging efficiency is reduced, there are possibilities that the charging power is excessively restricted or the temperature rise in the secondary battery is not sufficiently suppressed.

The present invention provides a charging control method and a charging control device for a secondary battery, which is capable of performing appropriate management of charging even in a situation in which the charging efficiency of the secondary battery is reduced.

Means for Solving the Problems

A method of controlling charging of a secondary battery according to the present invention includes calculating an amount of heat generated by a secondary battery based on an inter-electrode-plate voltage, an internal resistance, an electric current value, and a charging efficiency of the secondary battery; calculating an amount of allowable heat generated by the secondary battery based on a cooling ability of a cooling unit that cools the secondary battery and a temperature of the secondary battery; and limiting charging power of the secondary battery when the amount of generated heat is greater than the amount of allowable generated heat.

In the method for controlling charging of a secondary battery, preferably, the charging efficiency is calculated based on the temperature or the current value, and the inter-electrode-plate voltage.

Further, in the method for controlling charging of a secondary battery, preferably, the step of limiting charging power of the secondary battery comprises limiting the charging power of the secondary battery such that the amount of generated heat corresponds to the amount of allowable generated heat.

Also, preferably, the method for controlling charging of a secondary battery includes defining the charging power of the secondary battery such that the amount of generated heat corresponds to the amount of allowable generated heat when the amount of generated heat is smaller than the amount of allowable generated heat.

Moreover, in the method for controlling charging of a secondary battery, preferably, the cooling ability of the cooling unit is expressed as either a temperature or a supply flow rate of a cooling medium which is supplied from the cooling unit.

Further, a device for controlling charging of a secondary battery according to the present invention includes a unit that calculates an amount of heat generated by a secondary battery based on an inter-electrode-plate voltage, an internal resistance, a current value, and a charging efficiency of the secondary battery; a unit that calculates an amount of allowable heat generated by the secondary battery based on a cooling ability of a cooling unit that cools the secondary battery and a temperature of the secondary battery; and a unit that limits charging power of the secondary battery when the amount of generated heat is greater than the amount of allowable generated heat.

Also, preferably, the device for controlling charging of a secondary battery includes a unit that calculates the charging efficiency of the secondary battery based on the temperature or the current value, and the inter-electrode-plate voltage.

In addition, in the device for controlling charging of a secondary battery, preferably, the unit that limits the charging power of the secondary battery limits the charging power of the secondary battery such that the amount of generated heat corresponds to the amount of allowable generated heat.

Moreover, preferably, the device for controlling charging of a secondary battery includes a unit that defines the charging power of the secondary battery such that the amount of generated heat corresponds to the amount of allowable generated heat when the amount of generated heat is smaller than the amount of allowable generated heat.

In addition, in the device for controlling charging of a secondary battery, preferably, the cooling ability of the cooling unit is expressed as either a temperature or a supply flow rate of a cooling medium which is supplied from the cooling unit.

Advantageous Effects of Invention

According to the present invention, it is possible to provide a charging control method and a charging control device for a secondary battery which are capable of performing appropriate management of charging even in a situation in which the charging efficiency of the secondary battery is reduced.

MODE FOR CARRYING OUT THE INVENTION

A preferred embodiment of the present invention will be described with reference to the drawings.

Figure 1:
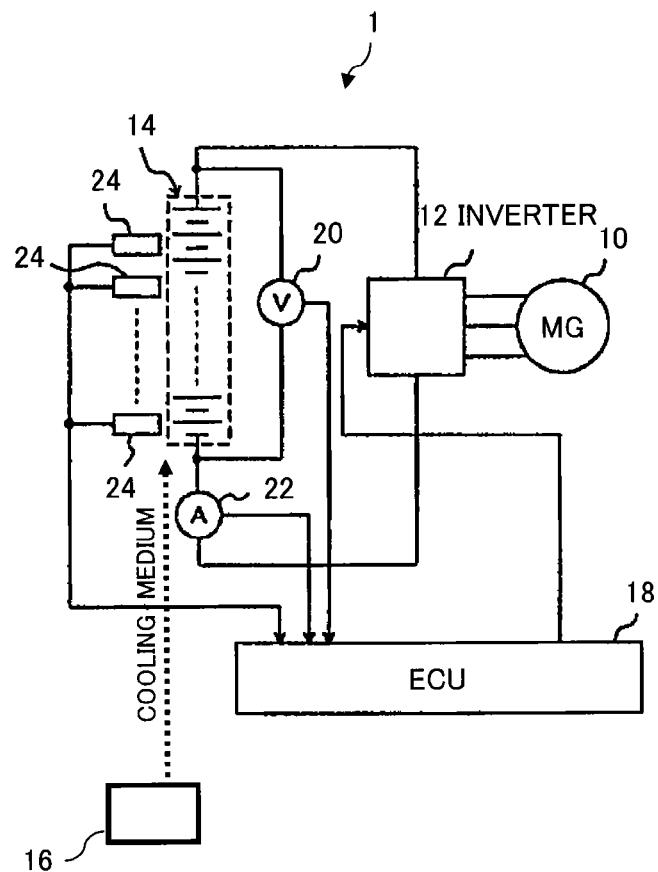
[FIG. 1] View schematically illustrating an example structure of a power unit of a vehicle in which a charging control device for a secondary battery according to an embodiment of the present invention is mounted.

FIG. 1 is a view schematically illustrating an example structure of a power unit of a vehicle in which a charging control device for a secondary battery according to the present embodiment is mounted. The charging control device according to the present embodiment is applicable to vehicles such as electric vehicles in which a secondary battery is mounted (including hybrid vehicles or the like). A power unit 1 of a vehicle illustrated in FIG. 1 includes a motor generator 10, an inverter 12 connected to the motor generator 10, a secondary battery 14 connected to the inverter 12, an air conditioning device 16 serving as a cooling unit which is used for cooling the secondary battery 14, and an ECU 18 which functions as a charging control device for controlling charging of electric power to the secondary battery 14. The ECU 18 is electrically connected with the motor generator 10, the inverter 12, and the secondary battery 14.

The motor generator 10 generates driving power by electric power supplied from the secondary battery 14 or the like. Further, when a vehicle is under regenerative control, the motor generator 10 operates as a power generator, which converts kinetic energy of the vehicle to electric energy for charging the secondary battery 14.

The inverter 12 converts direct current supplied from the secondary battery 14 or the like to alternating current for driving the motor generator 10. The inverter 12 also converts alternating current generated by the motor generator 10 to direct current for charging the secondary battery 14.

In general, the secondary battery 14 is configured as a battery module including a plurality of cells connected in series, in order to secure a certain level of voltage. While secondary batteries for any use may be applicable as the secondary battery 14 which is charging-controlled by the charging control device according to the present embodiment, a nickel-metal hydride secondary battery is preferably used. Nickel-metal hydride secondary batteries, when charged at a high voltage and a high temperature, generate gas due to a side reaction which is different from a charging reaction, thereby lowering the charging efficiency. In the charging control method of the present embodiment, however, because charging electric power is restricted in consideration of the amount of heat generation under the reduction of the charging efficiency as will be described below, it is possible to manage appropriate charging to the nickel-metal hydride secondary battery even in a state in which the charging efficiency is lowered. On the other hand, in the conventional control method in which the charging power is limited based on the storage amount and the temperature of the secondary battery, or the like, because the correlation between the storage amount and the charging efficiency is low and the storage amount cannot be estimated accurately, and also because a reduction in the charging efficiency caused by the memory effect is not considered, there are cases in which the charging power is excessively restricted or the temperature rise in the battery cannot be sufficiently suppressed.

A voltage sensor 20 which detects a terminal voltage of the secondary battery 14 and a current sensor 22 which detects electric current flowing in the secondary battery 14 are provided for the secondary battery 14. Also, temperature sensors 24 are provided at a plurality of locations of the secondary battery 14 for detecting the temperature of the secondary battery 14. Each of these sensors is electrically connected to the ECU 18 for transmitting data detected by each sensor to the ECU 18.

As the air conditioning device 16 which is used for cooling the secondary battery 14, an air conditioner or the like mounted in the vehicle can be used. In order to supply a cooing medium supplied from the air conditioner or the like to the secondary battery 14 through a vehicle cabin, a fan (which is not shown) is provided in a cooling passage through which the cooling medium passes. In the present embodiment, the air conditioning device 16 used for cooling the secondary battery 14 is not limited to an air conditioner, and a dedicated device designed for cooling the secondary battery 14 may be separately provided as the air conditioning device 16.

The ECU 18 calculates the charging efficiency of the secondary battery 14 based on the temperature or the current value of the secondary battery 14, and the inter-electrode-plate voltage of the secondary battery 14. Here, the inter-electrode-plate voltage refers to a voltage between a negative electrode and a positive electrode of the secondary battery 14 and can be obtained by removing, from the terminal voltage of the secondary battery 14 which is detected by the voltage sensor 20, IR obtained by the electric current flowing in the second battery 14 and the internal resistance of the secondary battery 14 (see the following equation (1)).

$$V_0 = VB + (IB \times R) \quad (1)$$

$V_0$: inter-electrode-plate voltage of secondary battery
VB: terminal voltage of secondary battery
IB: current value of secondary battery (which is negative on the charging side)
R: internal resistance of secondary battery No particular limitation is imposed on the method of calculating the internal resistance of the secondary battery 14. For example, a plurality of current values and voltage values are plotted on voltage-current coordinates to obtain a first-order approximation along the plotted points, and a slope of the straight line represented by this approximation is calculated as the internal resistance. Alternatively, because the internal resistance changes depending on the temperature of the secondary battery 14, a map representing the relationship between the internal resistance and the temperature of the secondary battery 14 is stored in advance in the ECU 18, so that data of the temperature detected by the temperature sensors 24 may be applied to the map for calculating the internal resistance.

Further, the inter-electrode-plate voltage is obtained by the ECU 18, by applying the terminal voltage and the current value detected by the current sensor 22 and the voltage sensor 20 and the internal resistance calculated as described above to the above equation (1). Preferably, for example, annealing (filter) of several seconds' duration is set for each sensor or the ECU 18 to thereby remove effects of noise or the like when calculating the inter-electrode-plate voltage. Further, when a plurality of voltage sensors 20 are provided, the highest voltage of the voltages detected by the plurality of sensors 20 is preferably used for calculating the inter-electrode-plate voltage, in view of the efficient charging control of the secondary battery 14. Here, while the inter-electrode-plate voltage can be obtained simply and accurately with the method described above, the method of obtaining the inter-electrode-plate voltage is not limited to this method, and there may also be used a method in which voltage sensors 20 are provided for the positive electrode and the negative electrode to thereby directly detect the inter-electrode-plate voltage of the secondary battery 14.

Figure 2:
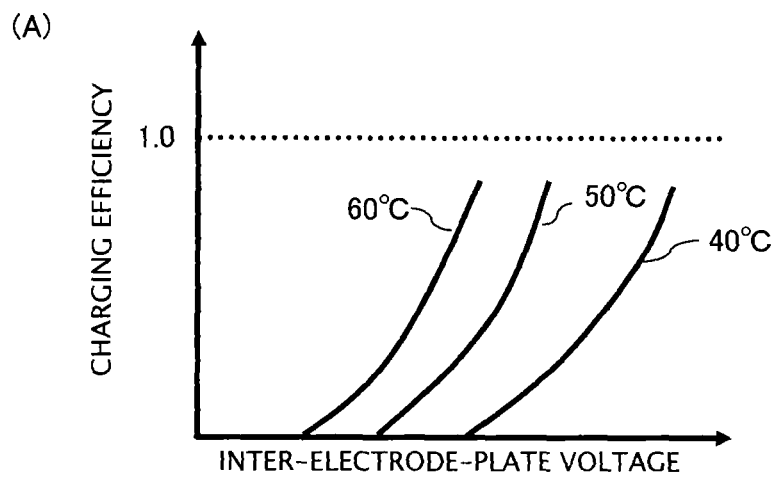
[FIG. 2] Maps representing a relationship between inter-electrode-plate voltage and charging efficiency of a secondary battery.
Figure 2:
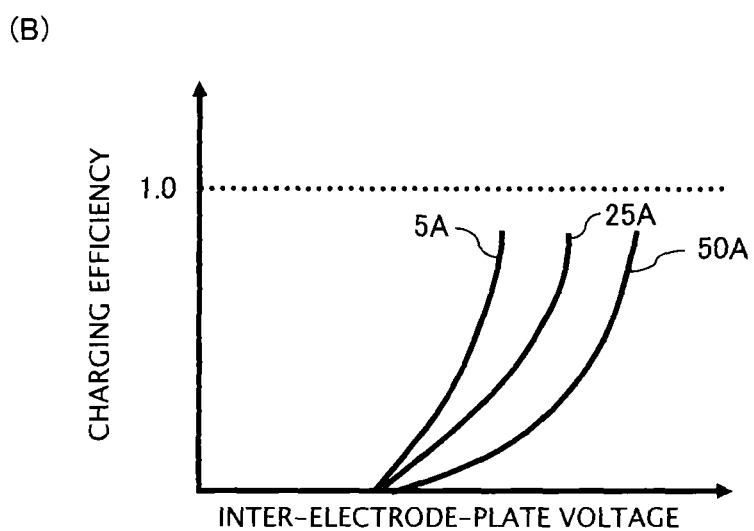

The ECU 18 calculates the charging efficiency of the secondary battery 14 based on the temperature or the current value, and the inter-electrode-plate voltage of the secondary battery 14. For calculation of the charging efficiency of the secondary battery 14, there is used, for example, a map representing a relationship between the inter-electrode-plate voltage and the charging efficiency of the secondary battery 14 as illustrated in FIG. 2. Here, the charging efficiency refers to a ratio of an amount of electricity actually stored with respect to the charging electric charge amount ($\eta$) or a ratio of an amount of electricity which could not be stored due to generation of gas or the like ($\beta = 1 - \eta$).

As the relationship between the inter-electrode-plate voltage and the charging efficiency of the secondary battery 14 depends on the temperature or the current value of the secondary battery 14, it is desirable to prepare a map representing the relationship between the inter-electrode-plate voltage and the charging efficiency at several different temperatures of the secondary battery 14, such as when the temperature of the secondary battery is 40° C., 50° C., or 60° C., for example, as illustrated in FIG. 2(A), or to prepare a map representing the relationship between the inter-electrode-plate voltage and the charging efficiency in the case of several different current values of the secondary battery 14, such as when the current value of the secondary battery is 5 A, 25 A, or 50 A, for example, as illustrated in FIG. 2(B).

When the temperature detected by the temperature sensor 24 is 40° C., for example, the ECU 18 applies the inter-electrode-plate voltage which is calculated as described above to a map representing the relationship between the inter-electrode-plate and the charging efficiency when the temperature is 40° C. (refer to FIG. 2(A)), thereby calculating the charging efficiency. Further, when the current value detected by the current sensor 22 is 5 A, for example, the ECU 18 applies the inter-electrode-plate voltage which is calculated as described above to a map representing the relationship between the inter-electrode-plate and the charging efficiency when the current value is 5 A (refer to FIG. 2(B)), thereby calculating the charging efficiency. If the temperature detected by the temperature sensor 24 and the current value detected by the current sensor 22 are not in the map, the map may be corrected by a linear interpolation method, for example, to thereby obtain the charging efficiency. Also, in order to calculate the charging efficiency more accurately, there may be provided a map representing the inter-electrode-plate voltage and the charging efficiency in which the interval of the temperature or the current value is set to be smaller (e.g., every 1° C. or 1 A).

Further, when a plurality of the temperature sensors 24 are provided, the charging efficiencies are desirably calculated at the temperatures detected by the respective temperature sensors 24 and the maximum charging efficiency among them adopted, in consideration of efficient charging control of the secondary battery 14. Here, the method for calculating the charging efficiency is not limited to the above examples, and there can be adopted any calculation methods or detection methods which are conventionally known.

Figure 3:
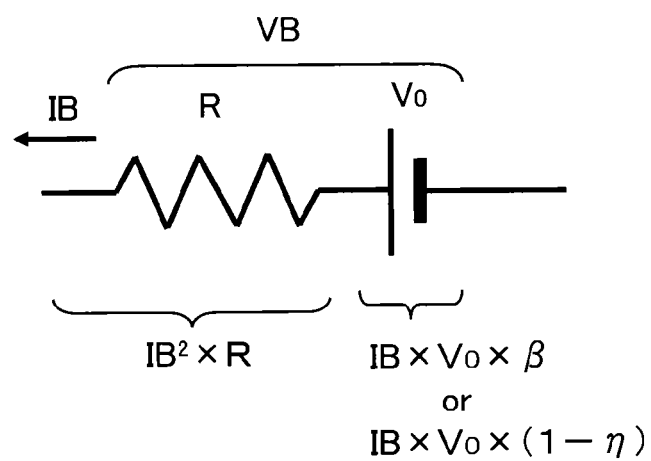
[FIG. 3] View illustrating a circuit model of a secondary battery.

The ECU 18 calculates the amount heat generated by the secondary battery 14 at the time of charging, based on the inter-electrode-plate voltage, the current value, the internal resistance, and the charging efficiency of the secondary battery 14. FIG. 3 illustrates a circuit model of a secondary battery. The amount (W) of heat generated by the secondary battery 14 at the time of charging is a sum of Joule heat and heat generated by the secondary battery 14 in association with a reduction in the charging efficiency, and is represented by the following equation (2) or (3):

$$W = IB^2 \times R + (IB \times V_0 \times \beta) \quad (2)$$

$$W = IB^2 \times R + (IB \times V_0 \times (1-\eta)) \quad (3)$$

Figure 4:
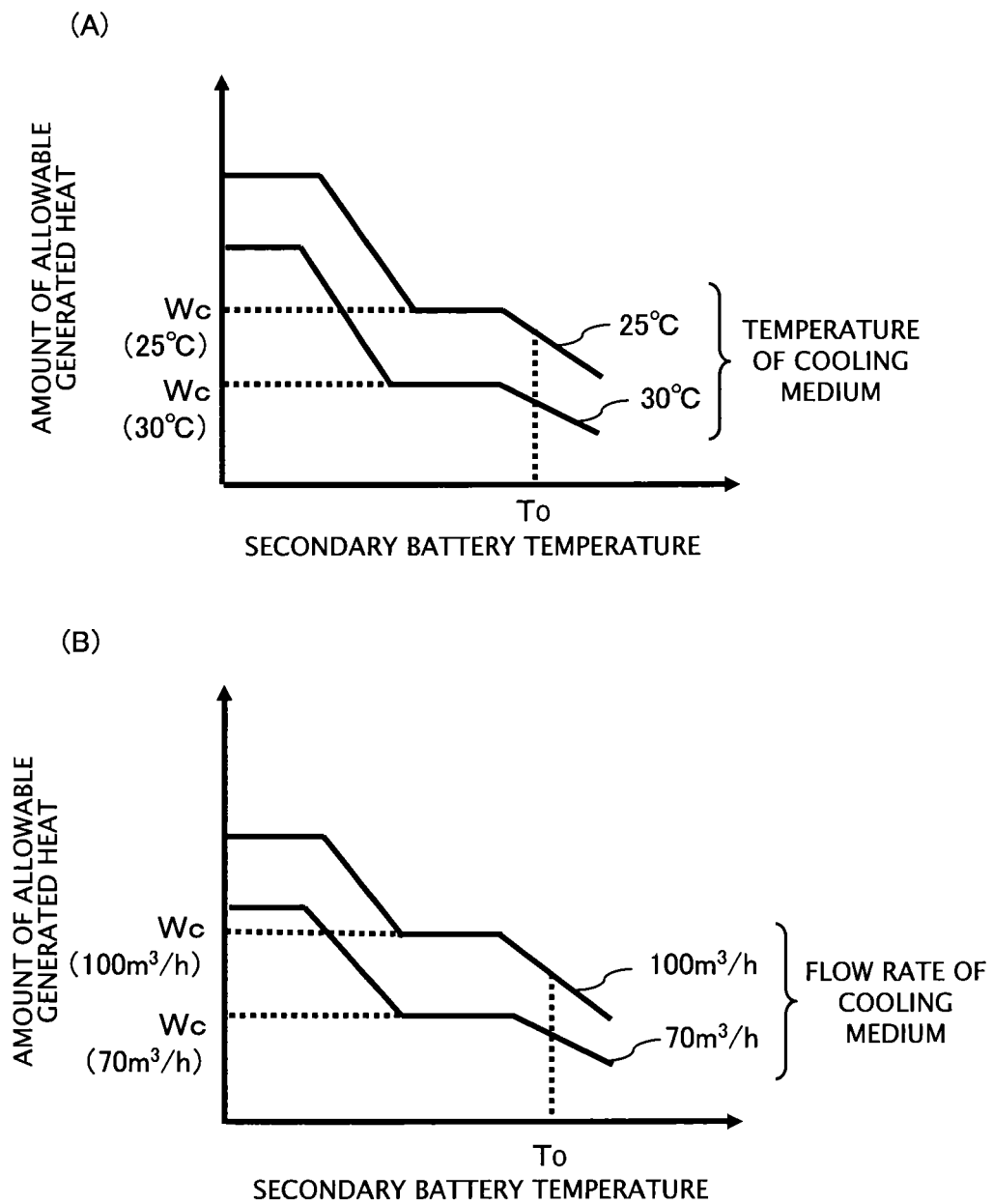
[FIG. 4] Maps representing a relationship between temperature and an amount of allowable generated heat of a secondary battery.

W: amount of heat generated by secondary battery
IB: current of secondary battery (negative on charging side)
R: internal resistance of secondary battery $V_0$: inter-electrode-plate voltage $\beta, \eta$: charging efficiency The ECU 18 further calculates an amount of allowable heat generated by the secondary battery 14 at the time of charging, based on the cooling ability of the air conditioning device 16 which cools the secondary battery 14 and the temperature of the secondary battery 14. For calculating the amount of allowable heat generated by the secondary battery 14 by the ECU 18, there is used, for example, a map representing a relationship between the temperature and the allowable heat generation amount of the secondary battery 14 as illustrated in FIG. 4. The amount of allowable heat generated by the secondary battery 14 refers to the upper limit value of the amount of heat which is generated by the secondary battery 14 at a certain temperature by charging.

As the relationship between the temperature and the amount of allowable heat generation of the secondary battery 14 depends on the cooling ability of the air conditioning device 16 which cools the secondary battery 14, it is desirable to prepare a map representing the relationship between the temperature and the amount of allowable heat generation of the secondary battery 14 when the cooling medium supplied from the air conditioning device 16 is at several different temperatures, such as 25° C. or 30° C., for example, as illustrated in FIG. 4(A), or to prepare a map representing the relationship between the temperature and the amount of allowable heat generation of the secondary battery 14 when the cooling medium supplied from the air conditioning device 16 flows at several different flow rates, such as 70 m$^3$/h or 100 m$^3$/h, for example, as illustrated in FIG. 4(B).

When the temperature of the cooling medium (which is detected by the temperature sensor 24 or the like provided on the air conditioning device 16) is 25° C., for example, the ECU 18 applies the temperature of the secondary battery 14 detected by the temperature sensor 24 to a map representing the relationship between the temperature of the second battery 14 and the amount of allowable heat generation of the second battery 14 when the temperature of the cooling medium is 25° C. (refer to FIG. 4(A)), thereby calculating the amount of allowable heat generation. Further, when the flow rate of the cooling medium (which is detected by a flow rate sensor or the like provided on the air conditioning device 16) is 70 m$^3$/h, for example, the ECU 18 applies the temperature of the secondary battery 14 detected by the temperature sensor 24 to a map representing the relationship between the temperature of the second battery 14 and the amount of allowable heat generation of the second battery 14 when the flow rate of the cooling medium is 70 m$^3$/h (refer to FIG. 4(B)), thereby calculating the allowable amount of heat generation. If the temperature and the flow rate of the cooling medium which are detected are not in the map, the map may be corrected by a linear interpolation method, for example, to thereby obtain the amount of allowable heat generation. Also, in order to calculate the amount of allowable heat generation more accurately, there may be provided a map representing the relationship between the temperature and the amount of allowable heat generation in which the interval of the temperature or the flow rate is set to be smaller (e.g. every 1° C. or 10 m$^3$/h). The calculation of the amount of allowable heat generation in the present embodiment is not limited to the above examples, and when the temperature of the secondary battery 14 is equal to or lower than a predetermined temperature ($T_0$), the amount of heat generated by the secondary battery 14, which can be cooled by the air conditioning device 16 (Wc (a fixed value)) illustrated in FIG. 4, may be set as the amount of allowable heat generation.

The ECU 18 compares the amount of generated heat to the amount of allowable generated heat, which are calculated as described above, and limits the charging power to charge the secondary battery 14 when the amount of generated heat is greater than the amount of allowable generated heat. As a result, the temperature rise in the secondary battery at the time of charging is suppressed so that deterioration of the secondary battery can be reduced. On the other hand, when the amount of generated heat is smaller than the amount of allowable generated heat, as the effects of deterioration of the secondary battery caused by the temperature rise thereof are not significant, charging is performed without any limits to thereby reduce the charging power for charging the secondary battery 14.

In the present embodiment, no particular limitation is imposed on the charging power when the amount of heat generation is greater than the amount of allowable heat generation, so long as it is determined so as not to exceed the range of the amount of allowable heat generation which is calculated. For example, the amount of allowable generated heat which is calculated is set as Initial Win (initial charging power), and a value which is obtained by subtracting a predetermined limit power ($\Delta W_1$) from Initial Win is determined as limited charging power (Win$_1$). Here, Initial Win may be obtained from a map which is represented as a function of the storage amount, the temperature, or the like of the secondary battery, for example. Further, the predetermined power ($\Delta W_1$) described above is preferably set to a value by which the amount of generated heat which is calculated corresponds to the allowable amount of generated heat. On the other hand, when the amount of generated heat is smaller than the amount of allowable generated heat, it is possible to determine the charging power for charging the secondary battery 14 as the amount of allowable generated heat which is calculated, or to set the calculated amount of allowable generated heat to Initial Win (initial charging power) and determine a value obtained by adding a predetermined power ($\Delta W_2$) to Initial Win as charging power (Win$_2$) for charging the secondary battery 14. Further, the predetermined power ($\Delta W_2$) described above is preferably set to a value by which the amount of generated heat which is calculated corresponds to the amount of allowable generated heat. Also, in the present embodiment, feedback control of the charging power (Win$_1$, Win$_2$) is preferably performed such that the amount of generated heat is the amount of allowable generated heat.

The charging control method according to the present embodiment can be used in combination with a conventional control method of limiting the charging power based on the storage amount and the temperature of the secondary battery, for example. When the conventional control method is combined, the charging power is preferably limited by, for example, comparing the charging power limited in the present embodiment and the charging power limited in the conventional control method and adopting the smallest charging power. Further, it is also possible to adopt the conventional control method of limiting the charging power based on the storage amount and the temperature of the secondary battery in a certain situation and to adopt the charging control method of the present embodiment in another situation. Because, with the charging control method according to the present embodiment, even in a situation in which the charging efficiency is lowered due to generation of gas or the like, the charging can be controlled appropriately to suppress deterioration of the secondary battery 14, it is possible to adopt the charging control method of the present embodiment when the charging efficiency is equal to or lower than or equal to or higher than a predetermined value (e.g. $\eta$ is 80% or less, or $\beta$ is 20% or higher) and adopt the conventional charging control method in other situations, for example. Further, in consideration of a situation in which the charging efficiency is likely to deteriorate, such as when a large quantity of electric current flows in the secondary battery 14 due to regenerative charging on a downward slope, when the internal resistance is high, when the temperature of the secondary battery is high, when overcharging is performed, or the like, the charging power can be limited by adopting the charging control method of the present embodiment at the predetermined current value or greater, at the predetermined inter-electrode-plate voltage (or inter-terminal voltage) or greater, at the predetermined internal resistance or greater, at the predetermined secondary battery temperature or higher, or at the predetermined storage amount or greater, and adopting the conventional control method in other times, for example.

Figure 5:
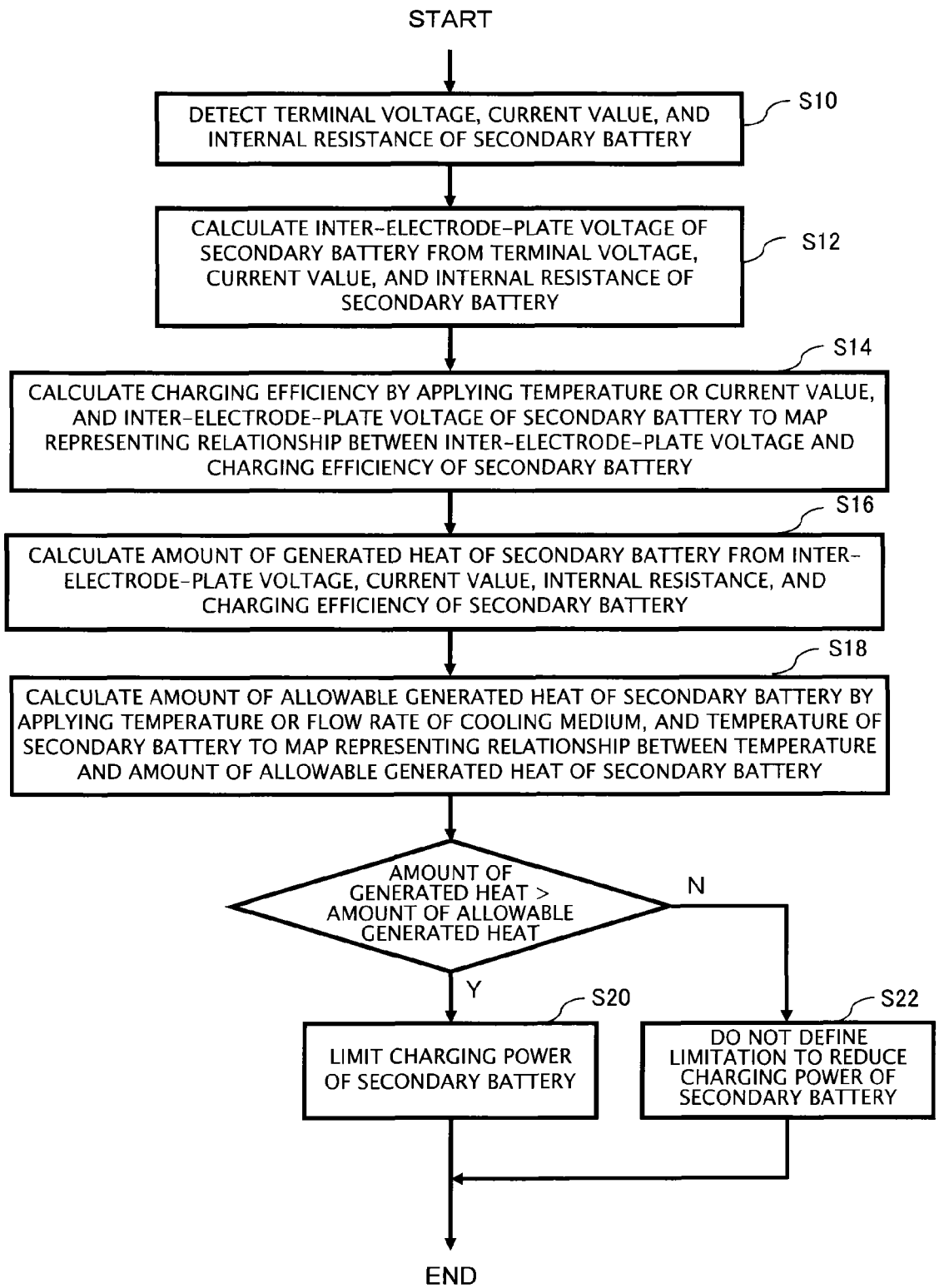
[FIG. 5] Flowchart illustrating an example operation of the charging control device for a secondary battery according to the present embodiment.

FIG. 5 is a flowchart illustrating an example operation of the charging control device of a secondary battery according to the present embodiment. As illustrated in FIG. 5, in step S10, the terminal voltage and the current value of the secondary battery 14 are detected by the voltage sensor 20 and the current sensor 22, respectively, and the internal resistance is further detected based on the terminal voltage and the current value. At this time, the internal resistance may be calculated by applying the temperature data obtained by the temperature sensor 24 to a map representing a relationship between the internal resistance and temperature. In step S12, the ECU 18 applies the terminal voltage, the current value, and the internal resistance of the secondary battery 14 to the above equation (1) to calculate the inter-electrode-plate voltage of the secondary battery 14. In step S14, the ECU 18 applies the temperature or the current value of the secondary battery 14 that are detected as described above, and the inter-electrode-plate voltage which is calculated as described above to a map (see FIG. 2(A)) representing the relationship between the inter-electrode-plate voltage and the charging efficiency (η or β) at each temperature of the secondary battery 14 or to a map (see FIG. 2(B)) representing the relationship between the inter-electrode-plate voltage and the charging efficiency (η or β) at each current value of the secondary battery 14, to thereby calculate the charging efficiency. In step S16, the ECU 18 applies the inter-electrode-plate voltage, the current value, the internal resistance, and the charging efficiency (η or β) to the above equation (2) or (3) to thereby calculate the amount of heat generated by the secondary battery 14. In step S18, the ECU 18 applies the temperature or the flow rate of the cooling medium and the temperature of the secondary battery 14 which is detected as described above, to a map (see FIG. 4(A)) representing the relationship between the temperature and the amount of allowable generated heat at each temperature of the cooling medium supplied from the air conditioning device 16 or to a map (see FIG. 4(B)) representing the relationship between the temperature and the amount of allowable generated heat at each flow rate of the cooling medium supplied from the air conditioning device 16, to thereby calculate the amount of allowable generated heat of the secondary battery 14.

Further, the ECU 18 compares the amount of generated heat and the amount of allowable generated heat that are calculated as described above, and, when the amount of generated heat is greater than the amount of allowable generated heat, the processing proceeds to step S20 to limit the charging power for charging the secondary battery 14. When the amount of generated heat is smaller than the amount of allowable generated heat, the processing proceeds to step S22 where a limitation to reduce the charging power for charging the secondary battery 14 is not defined. In the present embodiment, feedback control of the charging power is preferably performed such that the amount of generated heat corresponds to the amount of allowable generated heat by limiting the charging power when the amount of generated heat is greater than the amount of allowable generated heat or by adding a predetermined electric power to the charging power when the amount of generated heat is smaller than the amount of allowable generated heat, in a repeated manner.

REFERENCE SYMBOL LIST 1 power unit, 10 motor generator, 12 inverter, 14 secondary battery, 16 air conditioning device, 20 voltage sensor, 22 current sensor, 24 temperature sensor

The invention claimed is:

1. A method for controlling charging of a secondary battery, the method comprising:
    calculating an amount of heat generated by a secondary battery based on an inter-electrode-plate voltage, an internal resistance, a current value, and charging efficiency of the secondary battery;
    calculating an amount of allowable heat generated by the secondary battery based on a cooling ability of a cooling unit which cools the secondary battery and a temperature of the secondary battery; and
    limiting, by using a charging control device, charging power of the secondary battery when the amount of generated heat is greater than the amount of allowable generated heat,
    wherein the charging efficiency of the secondary battery includes a ratio of an amount of electricity actually stored with respect to a charging electric charge amount.

2. The method for controlling charging of a secondary battery according to claim 1, wherein
    the charging efficiency is calculated based on the temperature or the current value, and the inter-electrode-plate voltage.

3. The method for controlling charging of a secondary battery according to claim 1, wherein
    the limiting charging power of the secondary battery comprises limiting the charging power of the secondary battery such that the amount of generated heat corresponds to the amount of allowable generated heat.

4. The method for controlling charging of a secondary battery according to claim 1, further comprising:
    defining the charging power of the secondary battery such that the amount of generated heat corresponds to the amount of allowable generated heat when the amount of generated heat is smaller than the amount of allowable generated heat.

5. The method for controlling charging of a secondary battery according to claim 1, wherein
    the cooling ability of the cooling unit is expressed as either a temperature or a supply flow rate of a cooling medium which is supplied from the cooling unit.

6. The method for controlling charging of a secondary battery according to claim 1, wherein the amount of heat generated by the secondary battery is calculated by:

$$W = IB^2 \times R + (IB \times V_0 \times (1-\eta)), \text{ where}$$

W is the amount of heat generated by the secondary battery,
IB is the current value,
R is the internal resistance,
$V_0$ is the inter-electrode-plate-voltage, and
η is the charging efficiency.

7. A device for controlling charging of a secondary battery, the device comprising:

a unit that calculates an amount of heat generated by a secondary battery based on an inter-electrode-plate voltage, an internal resistance, a current value, and charging efficiency of the secondary battery;

a unit that calculates an amount of allowable heat generated by the secondary battery based on a cooling ability of a cooling unit that cools the secondary battery and a temperature of the secondary battery; and a unit that limits charging power of the secondary battery when the amount of generated heat is greater than the amount of allowable generated heat, wherein the charging efficiency of the secondary battery includes a ratio of an amount of electricity actually stored with respect to a charging electric charge amount.

8. The device for controlling charging of a secondary battery according to claim 7, comprising:

a unit that calculates the charging efficiency of the secondary battery based on the temperature or the current value, and the inter-electrode-plate voltage.

9. The device for controlling charging of a secondary battery according to claim 7, wherein the unit that limits the charging power of the secondary battery limits the charging power of the secondary battery such that the amount of generated heat corresponds to the amount of allowable generated heat.

10. The device for controlling charging of a secondary battery according to claim 7, comprising:

a unit that defines the charging power of the secondary battery such that the amount of generated heat corresponds to the amount of allowable generated heat when the amount of generated heat is smaller than the amount of allowable generated heat.

11. The device for controlling charging of a secondary battery according to claim 7, wherein the cooling ability of the cooling unit is expressed as either a temperature or a supply flow rate of a cooling medium which is supplied from the cooling unit.

12. The device for controlling charging of a secondary battery according to claim 7, wherein the unit that calculates the amount of heat generated by the secondary battery calculates the amount of heat generated by the secondary battery by:

$$W = IB^2 \times R + (IB \times V_0) \times (1-\eta), \text{ where}$$

W is the amount of heat generated by the secondary battery,
IB is the current value,
R is the internal resistance,
$V_0$ is the inter-electrode-plate-voltage, and
$\eta$ is the charging efficiency.

* * * * *